Sept. 25, 1928.

G. M. ALBRECHT 1,685,737

DYNAMO ELECTRIC MACHINE AND WINDING THEREFOR

Filed June 5, 1926　　　3 Sheets-Sheet 1

Inventor
G. M. Albrecht
by
Attorney

Sept. 25, 1928.　　　　　　G. M. ALBRECHT　　　　　　1,685,737
DYNAMO ELECTRIC MACHINE AND WINDING THEREFOR
Filed June 5, 1926　　　　3 Sheets-Sheet 3

Patented Sept. 25, 1928.

1,685,737

UNITED STATES PATENT OFFICE.

GEORGE M. ALBRECHT, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

DYNAMO-ELECTRIC MACHINE AND WINDING THEREFOR.

Application filed June 5, 1926. Serial No. 113,904.

This invention relates to dynamo-electric machines and windings therefor.

One of the objects is the provision of a dynamo-electric machine in which the number of circuits is greater than the number of poles; and more specifically in cases where the number of pairs of poles is an odd number.

Another object is the provision of machines of the hereinbefore mentioned characteristics in which the number of circuits is equal to the number of poles multiplied by an even number, and more specifically in which said number may be, for example, 2, 4, 8, etc.

Another object is the provision of machines of the hereinbefore mentioned characteristics in which the currents in the various armature paths are equalized. Still another object is the provision of a winding in which the potential rise from one brush to another measured from bar to bar on the commutator will be a substantially smooth curve.

A further object is to accomplish the hereinbefore mentioned results without the use of external cross connectors.

Other objects will appear hereinafter as the description of the invention proceeds.

The novel features of the invention will appear from this specification and the accompanying drawings forming a part thereof and disclosing several embodiments of the invention, and all these novel features are intended to be pointed out in the claims.

Figure 1:
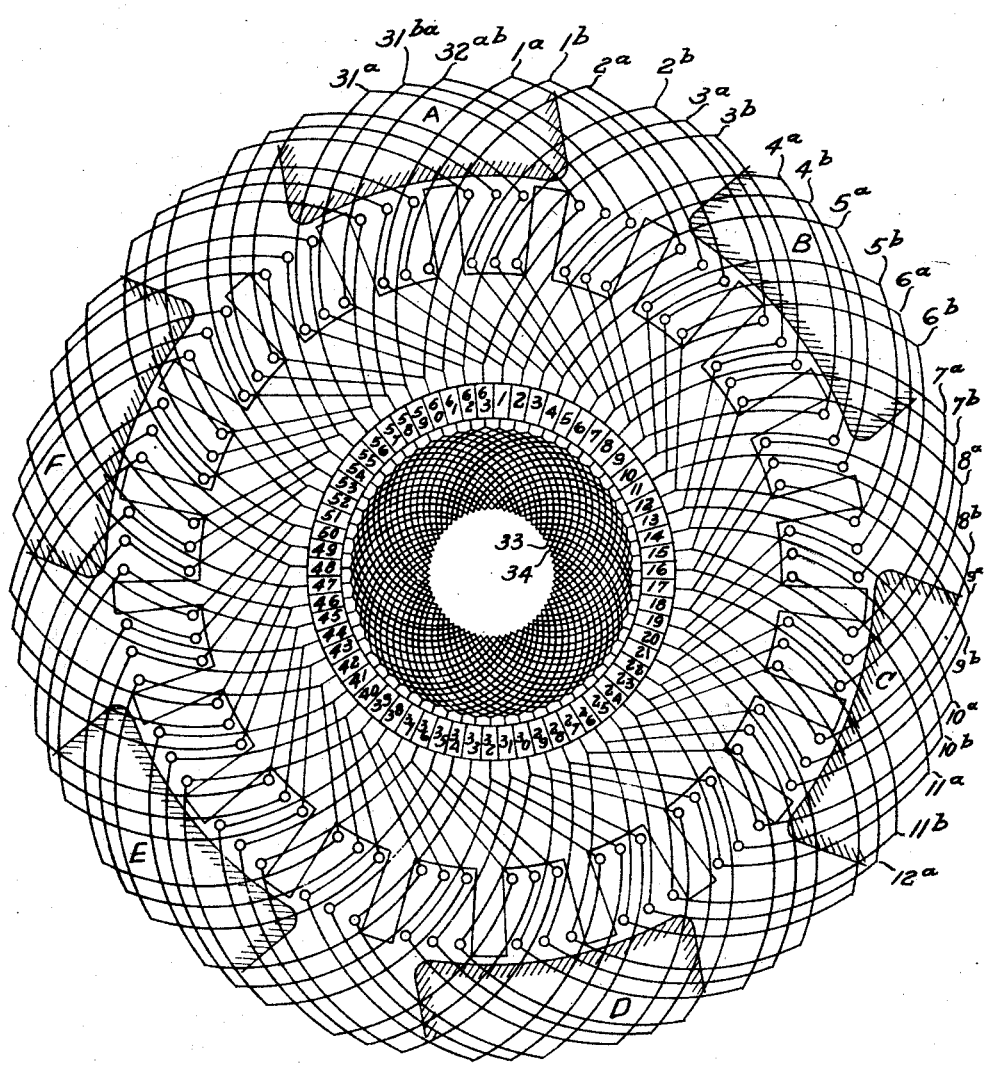
Fig. 1 is a diagrammatic view of a dynamo-electric machine embodying the invention and utilizing external cross connectors.

Referring to Fig. 1, the machine here shown has an odd number of pairs of poles, there being six poles A, B, C, D, E, F. The armature is here shown of the slotted type, having 21 slots. The commutator has 63 bars to which are connected 63 coils here shown of the lap type. The number of slots and bars are thus both odd and are respectively divisible by the number of pairs of poles. There being 21 slots there are therefore 3 coils per slot. Stated in other words, there are 6 coil sides in every slot and as each coil has 2 sides it is ordinarily said that the slot contains 3 coils though the coil sides belong to 6 different coils. The winding here shown is what may be termed a doubly reentrant winding of the simplex type. Under the term simplex is to be understood a winding in which if we begin tracing through the winding at a given commutator bar we must pass through all of the conductors before we again reach the bar at which tracing began. A doubly reentrant simplex winding may be defined as one in which 2 rounds of the armature must be made before all of the coils are included and the bar at which tracing began is again reached. For example, if we begin tracing at bar 1 passing successively through coils $1^a$, $2^a$, $3^a$, $4^a$ and so on, we reach coil $31^a$ and bar 63. From bar 63 on we may trace through coil $32^{ab}$ to bar 2 and from there proceed through coils $1^b$, $2^b$, $3^b$, $4^b$ and so on until we reach coil $31^{ba}$ which is connected to bar 1 at which tracing began. 2 rounds of the armature have therefore been made. Such a winding has twice as many circuits as the number of poles, in this case therefore, 12 circuits. It may be noted at this point that a distinction is to be made between a doubly or, in general, a multiply reentrant winding and a duplex or, in general, a multiplex winding. In a duplex winding the armature has 2 independent simplex windings, that is, if tracing is begun at a given bar this bar is again reached when half of the conductors of the winding have been traced, it being then necessary to start at another bar in order to trace the remaining conductors. Such a winding is unsuitable in a machine having an odd number of poles for the reason that it cannot be properly equalized.

By properly selecting the various factors of the machine the winding such as shown in Fig. 1 may be equalized. The number of slots or bars must be an odd number, respectively, divisible by the number of pairs of poles. Moreover, as is practically always the case in a commercial machine when the number of coils per slot is greater than 1 said number must be prime to the number of rounds or reentrances of the winding. For example, whereas in Fig. 1, the number of reentrances is 2 and there is to be more than one coil per slot the number of coils per slot must be 3 or 5 or 7 and so on. The number of pairs of poles must moreover be odd. The back conductor pitch of the coils of the winding should be odd and for manufacturing reasons is preferably made so that the slot pitch of all coils will be the same. In the particular instance shown the back conductor pitch is 17 and the slot pitch of the coils is 3, it being noted that there are 3½ slots per pole. The front conductor pitch of the coils should be made equal to the difference between the back conductor pitch and 2 times the desired number of reentrances of the winding, and is therefore in the present instance equal to 13. The number of circuits desired naturally determines, with a given number of poles, the number of reentrances. That is, referring to Fig. 1 if 12 circuits are desired on a six pole machine the winding is made doubly reentrant. The commutator pitch of the coils is made equal to the number of reentrances, that is, 2, in Fig. 1.

With the factors chosen as hereinbefore stated the winding may be effectively cross connected. It will be noted if we take, for example, coil 1ª connected to bars 1 and 3, that this coil is disposed in the same position with respect to poles A and B as is coil 11ᵇ with respect to poles C and D, the latter coil being connected to bars 22 and 24. Bars 1 and 22 are therefore equipotential and may be connected with a cross connector here diagrammatically indicated as a conductor 33. It will be noted, however, that coil 11ᵇ is in one round of the winding whereas coil 1ª is in another round. Equalization therefore occurs as between these two rounds. In like manner coil 1ᵇ connected to bars 2 and 4 is disposed in exactly the same position with respect to poles A and B as is coil 12ª connected to bars 23 and 25. Bars 2 and 23 may therefore be connected by a cross connector 34. Coil 1ᵇ is in the same round as coil 11ᵇ whereas coil 12ª is in the same round as coil 1ª. It will be apparent therefore that all points of equipotential may be cross connected as shown in Fig. 1. The manner of winding and the choice of factors hereinbefore set forth thus results in a winding which may be effectively equalized inasmuch as coils in different rounds of the winding are disposed at equipotential points, so that there is no possibility that one of the rounds or any of the circuits will tend to carry more current than another. It is obvious that it is immaterial whether these connections are made at the commutator end of the machine or at the other end.

Figure 2:
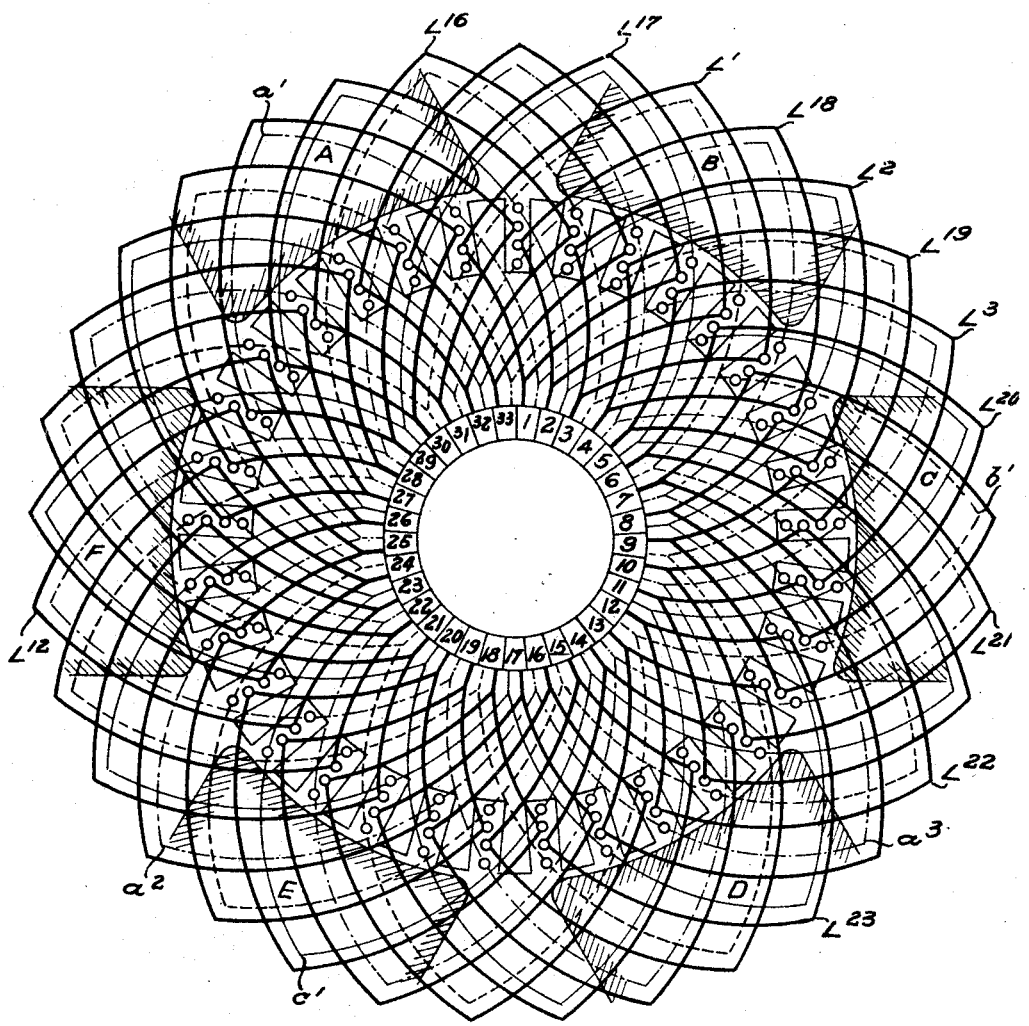
Fig. 2 is a diagrammatic view of a dynamo-electric machine in which the invention is embodied in a modified form, no external cross connectors being utilized.

Referring now to Fig. 2 the machine here shown has 6 poles A, B, C, D, E, F. For the sake of simplicity a comparatively small number of coils per slot has been shown, there being 33 slots and 33 commutator bars. The winding here shown comprises 132 conductors disposed in the slots, 66 of these conductors being connected in the form of a lap type winding and the remaining 66 in the form of a wave type winding. The lap type winding, in order to distinguish it from the wave type winding, is here shown in heavy lines and the conductors thereof are here shown in the second and third positions in the slots counting from the outer periphery, although they might be otherwise disposed. It will therefore be apparent that each winding has 33 coils. Each winding has one coil per slot, but if more coils per slot are desired the number must be prime to the number of reentrances of the lap winding.

The factors of lap type winding are selected as already set forth with respect to Fig. 1, and by way of example the winding of Fig. 2 is here shown as also of the doubly reentrant simplex type inasmuch as if we begin tracing at bar 1, for example, we pass successfully through coils L¹, L², L³ and so on, until we reach coil L¹⁶ which is connected to bar 33. From there we pass through coil L¹⁷ to bar 2 and begin another round of the armature before we again reach bar 1. The lap type winding therefore has 12 circuits. The coil pitches are governed in the same manner as already stated in connection with Fig. 1.

The wave type winding in Fig. 2 comprises three independent wave windings and it is therefore of the triplex type. One of these windings is distinguished by the dotted lines, another by the dot and dash lines and another by the light full lines. The factors for this triplex wave type winding are so chosen that the total number of circuits will be the same as for the lap type winding, that is, 12. Each of the simplex wave type windings constituting the triplex winding is doubly reentrant and therefore each has 4 circuits so that the 3 simplex windings together constituting the triplex winding have 12 circuits. The average conductor pitch of the wave coils is so chosen that it is equal to the difference between the conductors allotted to the wave type winding and the number of circuits in the lap type winding, divided by the number of poles. So choosing the average pitch also predetermines the number of circuits in the wave winding as a whole whether the winding be multiplex, multiply reentrant, or any combination. The slot pitch of the wave coils is preferably made the same as for the lap coils if the number of slots per pole is an integer and the slot pitch of the lap coils is equal to the pole pitch and if not then it is made so that the slot pitch of the wave coils is equal to the difference between the slots per pair of poles and the slot pitch of the lap coils. In the case of Fig. 2 the slot pitch of the lap coils is 6 while that of the wave coils is 5. The commutator pitch of the wave coils is made equal to the difference between the commutator bars per pair of poles and the number of rounds or reentrances of the lap type winding, and is therefore 9.

The manner in which the winding of Fig. 2 is equalized without the use of cross connectors may be seen by the following consideration. It will be noted that coils $L^1$, $L^2$, and $L^3$ constituting a group of consecutive coils in a given round of the lap winding, the terminals of which group are at bars 1 and 7, are balanced by a group of three wave coils, namely, a coil $a^1$ in the dot and dash wave winding connected to bar 1 and bar 25, a coil $a^2$ connected from there to bar 16 and a coil $a^3$ connected from there to bar 7. The last three mentioned coils are influenced by all of the pairs of poles whereas the lap coils $L^1$, $L^2$, $L^3$ are influenced by only one pair of poles. These 2 groups of coils generate the same electromotive force and are balanced against each other. By inspection it will be noted that all of the lap coils are balanced against wave coils, group by group, as hereinbefore illustrated. It will also be noted that a coil such as $b^1$, in the dotted wave winding which is connected between bars 3 and 12 serves as a portion of an equalizing connection between bars 1 and 12. The lap coil $L^1$ connected to bars 1 and 3 serves as the other portion of the equalizing connection between bars 1 and 12 which are equipotential bars. The coils $L^1$ and $b^1$ are disposed to generate equal and opposite electromotive forces and under normal conditions no equalizing current flows through these coils. In a similar manner taking for example a coil $c^1$ of the light full line wave winding, which is connected to bars 13 and 23 this serves as a portion of an equalizing connection between the bars 14 and 25, the lap coil $L^{12}$ serving as the other portion. The wave coil $c^1$ thus serves also to connect the lap coil $L^{23}$ to the lap coil $L^{12}$ these coils being in different rounds of the lap winding. The same is true with respect to wave coil $b^1$ as to coils $L^1$ and $L^{23}$. It will be clear that all of the wave and lap coils serve as portions of equalizing connections.

Figure 3:
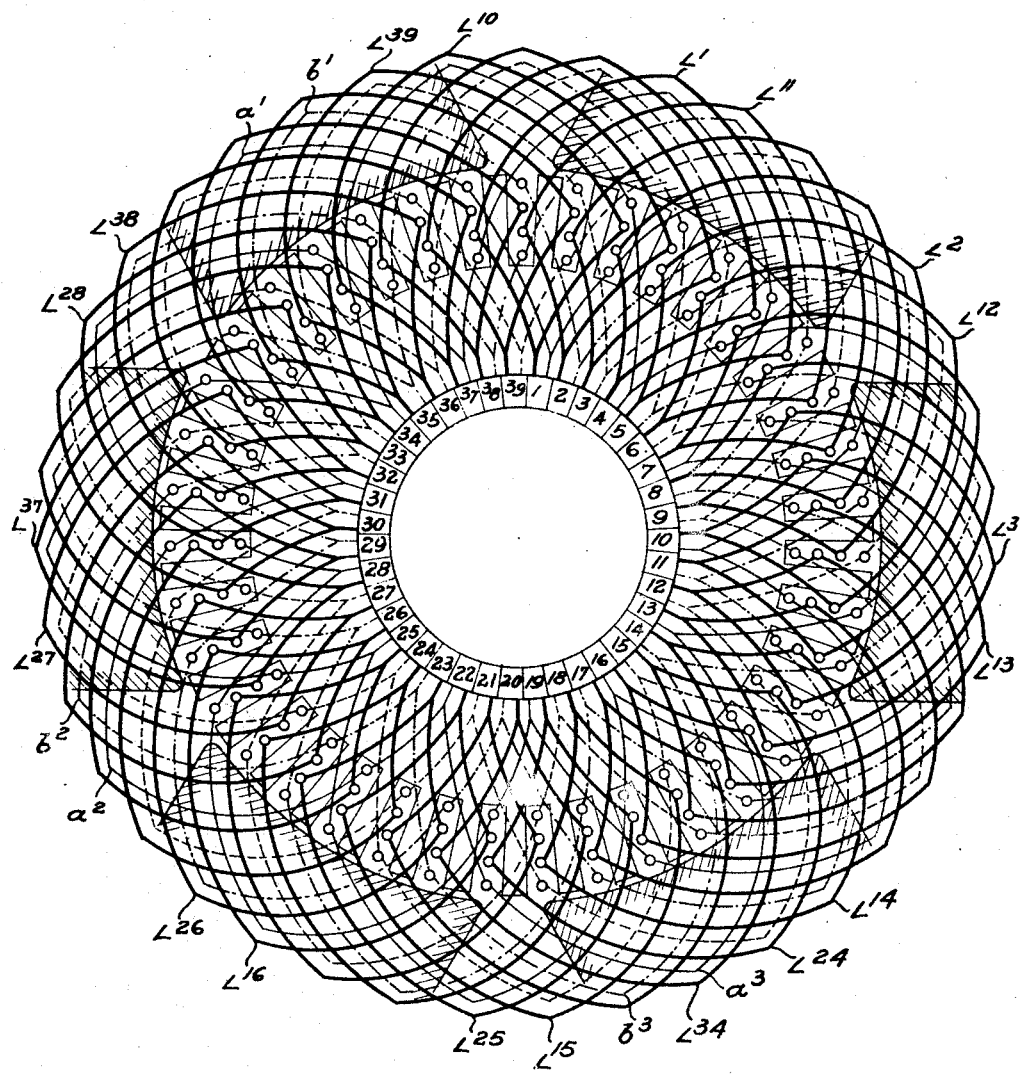
Fig. 3 is a diagrammatic view of another form of dynamo-electric machine also embodying the invention.

Fig. 3 shows how the invention may be applied in securing a 24 circuit equalized lap winding on a machine having 6 poles A, B, C, D, E, F. The armature has an odd number of slots, namely, 39 and the same number of commutator bars. In the slots are disposed 156 conductors, 78 of which are connected to form a simplex quadruply reentrant lap winding. The remaining half of the conductors are connected to form a triplex wave winding each component of which is quadruply reentrant and therefore has 24 circuits, the same as the lap winding. The number of coils per slot is governed in the manner already stated in connection with Figs. 1 and 2.

Taking a given group of consecutive lap coils such as $L^1$, $L^2$ and $L^3$ the terminals of which group are connected to bars 1 and 13 it will be noted that to these bars are also connected a group of wave coils in the light full line wave winding, namely, the coils $a^1$, $a^2$ and $a^3$, this group of wave coils being influenced by all of the poles whereas the group of lap coils is influenced by one pair of poles. Moreover the coil $a^1$ is connected to bar 1 to which is also connected coil $L^{39}$ which coil is in the 4th reentrance or round of the lap winding if we begin the first round with coil $L^1$. The coil $a^1$ is also connected to bar 31 to which is connected coil $L^{27}$ in the 3rd round which coil is disposed similarly to coil $L^1$ and therefore generates the same electromotive force. To bar 31 is also connected coil $L^{28}$ which is in the 3rd round. Coil $a^2$ is connected to bar 31 and to bar 22 to which latter is connected coil $L^{15}$ in the 2nd round and which coil is located similar to coil $L^{28}$. Coil $a^3$ is connected to bars 22 and 13. To bar 22 is also connected coil $L^{16}$ in the 2nd round and located similarly to coil $L^3$, the latter coil being connected to bar 13 as already noted.

Taking one other instance, it will be noted that the lap coils $L^{11}$, $L^{12}$ and $L^{13}$ which are in the 2nd round if we begin with coil $L^1$ as in the 1st round, are balanced by a group of wave coils $b^1$, $b^2$ and $b^3$ in the dot-and-dash wave winding. Coil $b^1$ connects between bars 2 and 32 to which latter are connected coils $L^{37}$ and $L^{38}$ both in the 4th round, coil $L^{37}$ being located similarly to coil $L^{11}$. Coil $b^2$ is connected between bars 32 and bar 23 to which latter are connected coils $L^{25}$ and $L^{26}$, both in the 3rd round, coil $L^{25}$ being located similarly to coil $L^{38}$. Coil $b^3$ is connected between bars 23 and bar 14 to which latter are connected coils $L^{13}$ and $L^{14}$, both in the 2nd round, coil $L^{13}$ being located similar to coil $L^{26}$.

It will be apparent without further explanation that the lap and wave type windings in Fig. 3 are thoroughly balanced and interconnected.

It should be understood that the invention claimed is not limited to the exact details of construction shown and described, for obvious modifications may occur to persons skilled in the art.

It is claimed and desired to secure by Letters Patent:

1. A multipolar dynamo-electric machine having an odd number of pairs of poles, an armature comprising a predetermined number of coils connected to form a simplex winding said winding being multiply reentrant an even number of times and having points of equal potential in different reentrances thereof, and a predetermined number of equalizing connections between points of equal potential.

2. A multipolar dynamo-electric machine having an odd number of pairs of poles, an armature for said machine and a winding therefor having a number of circuits equal to the number of poles multiplied by an even number, and means including a predetermined number of load-current-carrying conductors for equalizing the currents in said circuits.

3. A multipolar dynamo-electric machine having an odd number of pairs of poles, an armature comprising a predetermined number of coils connected to form a simplex winding, said winding being multiply reentrant an even number of times and having points of equal potential in different reentrances thereof, and a predetermined number of equalizing connections including a predetermined number of load-current-carrying conductors between points of equal potential.

4. In an armature for a multipolar dynamo-electric machine having an odd number of pair of poles, a winding for said armature having a number of circuits equal to the number of poles multiplied by an even number and having an odd number of coils the number of said coils being divisible by the number of pairs of poles, and equalizing connections for said winding.

5. In a commutator type slotted armature for a multipolar dynamo-electric machine having an odd number of pairs of poles, said armature having an odd number of slots, and an odd number of bars, the number of slots and bars being divisible respectively by the number of pairs of poles, a winding disposed in said slots and connected to said commutator, said winding having a number of circuits equal to the number of poles multiplied by an even number, and a predetermined number of equalizing connections for said winding.

6. In a commutator type slotted armature for a multipolar dynamo-electric machine having an odd number of pairs of poles, said armature having an odd number of slots, and an odd number of bars, the number of slots and bars being divisible respectively by the number of pairs of poles, a simplex multiply reentrant winding disposed in said slots and connected to said commutator, and a predetermined number of equalizing connections for said winding.

7. In a commutator type slotted armature for a multipolar dynamo-electric machine having an odd number of pairs of poles, said armature having a number of slots and bars respectively not divisible by a predetermined multiple of four, the number of slots and bars being divisible respectively by the number of pairs of poles, a winding disposed in said slots and connected to said commutator, said winding having a number of circuits equal to the number of poles multiplied by an even number, and a predetermined number of equalizing connections for said winding.

8. In a commutator type slotted armature for a multipolar dynamo-electric machine having an odd number of pairs of poles, said armature having a number of slots and bars respectively not divisible by a predetermined multiple of four, the number of slots and bars being divisible respectively by the number of pairs of poles, a simplex multiply reentrant winding disposed in said slots and connected to said commutator, and a predetermined number of equalizing connections for said winding.

9. A winding for a multipolar dynamo-electric machine, including a multiply reentrant lap type winding, and a wave type winding interconnected with said lap type winding.

10. A commutator type armature winding for a multipolar dynamo-electric machine including a multiply reentrant lap type winding, and a wave type winding interconnected with said lap type winding, both windings being connected to the same commutator.

11. A winding for a multipolar dynamo-electric machine, including a multiply reentrant lap type winding, and a predetermined number of wave type windings interconnected with said lap winding, the number of said wave windings being such and the individual reentrances such that the total number of circuits in said predetermined number of wave windings is equal to the total number of circuits in said lap winding.

12. A winding for a multipolar dynamo-electric machine including a multiply reentrant lap type winding, and a multiplex wave type winding interconnected with said lap winding.

13. A winding for a multipolar dynamo-electric machine including a multiply reentrant lap type winding, and a multiplex wave type winding interconnected with said lap winding, each component of said wave winding being multiply reentrant.

14. A winding for a multipolar dynamo-electric machine having an odd number of pairs of poles, including a lap type winding reentrant an even number of times, and a wave type winding interconnected with said lap winding.

15. In a slotted type armature for a multipolar dynamo-electric machine having an odd number of pairs of poles, said armature having an odd number of slots, the number of slots being divisible by the number of pairs of poles, a multiply reentrant winding disposed in said slots having a number of circuits equal to the number of poles multiplied by an even number, and means for electrically equalizing said circuits.

16. In a slotted type armature for a multipolar dynamo-electric machine having an odd number of pairs of poles, said armature having an odd number of slots, the number of slots being divisible by the number of pairs of poles, a multiply reentrant winding disposed in said slots having a number of circuits equal to the number of poles multiplied by an even number, the coils of said winding per slot being in number prime to the number of reentrances, and means for electrically equalizing said circuits.

17. An armature for a multipolar dynamo-electric machine, a winding for said armature including a multiply reentrant lap type winding, and a predetermined number of wave type windings, the coils of said wave winding having an average front and back conductor pitch equal to the difference between the number of conductors in said wave winding and the number of circuits in said multiply reentrant lap winding divided by the number of poles.

18. An armature for a multipolar dynamo-electric machine, a winding for said armature including a multiply reentrant lap type winding, and a predetermined number of wave type windings, the coils of said wave winding having a commutator pitch equal to the difference between the number of bars per pair of poles and the number of reentrances of said lap winding.

19. An armature for a multipolar dynamo-electric machine, a winding for said armature including a multiply reentrant lap type winding, and a predetermined number of winding, and a predetermined number of wave type windings, the coils of said wave winding having a slot pitch equal to the difference between the number of slots per pair of poles and the slot pitch of the lap coils.

20. A multipolar dynamo-electric machine having an odd number of pairs of poles, an armature for said machine, a commutator having commutating zones equal in number to the number of poles, a winding for said armature having a number of circuits equal to the number of poles multiplied by an even number, said winding providing an even number of paths independently traceable through connected coils from a zone of one sign to a zone of opposite sign, the coils comprising said paths being disposed on said armature and connected to said commutator so that a coil in one of said paths is disposed with respect to a given pair of poles similarly to a coil in a different one of said paths influenced by a different pair of poles and a predetermined number of equalizing connections between pairs of coils disposed as stated.

In testimony whereof the signature of the inventor is affixed hereto.

GEORGE M. ALBRECHT.